US009779174B2

(12) United States Patent
Sheik Adam et al.

(10) Patent No.: US 9,779,174 B2
(45) Date of Patent: Oct. 3, 2017

(54) FRAMEWORK FOR ANONYMOUS REPORTING OF SOCIAL INCIDENTS

(71) Applicant: SAP SE, Walldorf (DE)

(72) Inventors: Mohammed Arshad Sheik Adam, Singapore (SG); Kaushik Nath, Singapore (SG)

(73) Assignee: SAP SE, Walldorf (DE)

( * ) Notice: Subject to any disclaimer, the term of this patent is extended or adjusted under 35 U.S.C. 154(b) by 276 days.

(21) Appl. No.: 14/274,761

(22) Filed: May 11, 2014

(65) Prior Publication Data

US 2015/0324396 A1    Nov. 12, 2015

(51) Int. Cl.
| | | |
|---|---|---|
| G06F 17/30 | (2006.01) | |
| H04L 29/06 | (2006.01) | |
| G06Q 10/10 | (2012.01) | |
| G06Q 50/18 | (2012.01) | |
| G06Q 50/26 | (2012.01) | |

(52) U.S. Cl.
CPC .... *G06F 17/3089* (2013.01); *G06F 17/30289* (2013.01); *G06F 17/30353* (2013.01); *G06F 17/30864* (2013.01); *G06Q 10/10* (2013.01); *G06Q 50/18* (2013.01); *G06Q 50/26* (2013.01); *H04L 63/0407* (2013.01)

(58) Field of Classification Search
CPC .................................................. G06F 20/383
USPC ............................. 707/603, E17.014; 705/74
See application file for complete search history.

(56) References Cited

U.S. PATENT DOCUMENTS

| | | | | |
|---|---|---|---|---|
| 7,840,813 | B2 * | 11/2010 | Canard | G06F 21/33 |
| | | | | 705/37 |
| 8,447,984 | B1 * | 5/2013 | Siegel | G06Q 20/4097 |
| | | | | 713/173 |
| 8,786,433 | B2 | 7/2014 | Grebner et al. | |
| 8,861,896 | B2 | 10/2014 | Becker | |
| 2002/0116247 | A1 | 8/2002 | Tucker et al. | |
| 2004/0111377 | A1 | 6/2004 | Teberg et al. | |
| 2005/0097516 | A1 * | 5/2005 | Donnelly | G06Q 30/02 |
| | | | | 717/124 |
| 2005/0138111 | A1 * | 6/2005 | Aton | G06F 11/3476 |
| | | | | 709/201 |
| 2005/0203792 | A1 | 9/2005 | Kuppe et al. | |
| 2006/0143695 | A1 * | 6/2006 | Grynberg | H04L 63/0407 |
| | | | | 726/4 |
| 2007/0245144 | A1 * | 10/2007 | Wilson | G06F 21/6254 |
| | | | | 713/170 |
| 2007/0275743 | A1 | 11/2007 | Lovell | |
| 2007/0288273 | A1 * | 12/2007 | Rojewski | G06Q 10/0635 |
| | | | | 705/35 |
| 2008/0272884 | A1 | 11/2008 | Lovell | |
| 2009/0233631 | A1 | 9/2009 | Butler, Sr. et al. | |

(Continued)

*Primary Examiner* — Baoquoc N To
(74) *Attorney, Agent, or Firm* — Jones Day

(57) ABSTRACT

Described herein is a framework to facilitate anonymous reporting of social incidents. In accordance with one aspect of the framework, at least one input report of a social incident is received from at least one user device. The input report may be submitted by a user associated with verified credentials. An equivalence class may be identified for the input report. If a count associated with the equivalence class exceeds a predetermined threshold value, anonymized information based on the input report may be distributed to initiate action responsive to the social incident.

19 Claims, 3 Drawing Sheets

(56) References Cited

U.S. PATENT DOCUMENTS

| | | | |
|---|---|---|---|
| 2009/0235084 A1* | 9/2009 | Ferraro | G06Q 10/10 713/182 |
| 2010/0262932 A1 | 10/2010 | Pan | |
| 2010/0321156 A1* | 12/2010 | Pitt | G06F 21/32 340/5.82 |
| 2011/0010425 A1* | 1/2011 | Bernatz | G06Q 10/107 709/206 |
| 2011/0143707 A1 | 6/2011 | Darby, Jr. et al. | |
| 2011/0173693 A1* | 7/2011 | Wysopal | G06F 11/3612 726/19 |
| 2011/0189974 A1 | 8/2011 | Park et al. | |
| 2011/0217686 A1* | 9/2011 | Bernatz | G09B 5/00 434/350 |
| 2011/0258200 A1 | 10/2011 | Drummond | |
| 2012/0066176 A1* | 3/2012 | Martignoni | G06Q 50/18 707/609 |
| 2012/0290977 A1* | 11/2012 | Devecka | H04W 4/206 715/810 |
| 2013/0091581 A1* | 4/2013 | Pirani | G06F 21/31 726/26 |
| 2013/0111543 A1* | 5/2013 | Brown | H04L 63/0884 726/1 |
| 2013/0157612 A1 | 6/2013 | Cordero et al. | |
| 2013/0159836 A1 | 6/2013 | Ferraro et al. | |
| 2013/0232427 A1 | 9/2013 | Romero | |
| 2015/0186891 A1* | 7/2015 | Wagner | G06Q 20/4016 705/39 |

* cited by examiner

FRAMEWORK FOR ANONYMOUS REPORTING OF SOCIAL INCIDENTS

TECHNICAL FIELD

The present disclosure relates generally to computer systems, and more specifically, to a framework for anonymous reporting of social incidents.

BACKGROUND

In today's society, social, medical or legal assistance is often needed by vulnerable individuals (e.g., children, elderly, disabled, battered wives, etc.) who are unable to independently seek help. Examples of social incidents involving such vulnerable individuals include, for instance, child or elder abuse, animal abuse, spousal abuse, domestic violence, suicide, persons with mental disorder requiring assistance, kidnapping, and so forth. Government agencies or other aid organizations empowered to provide help often reach out to the public through mass communication for help in reporting such social incidents or to directly appeal to individuals to seek help.

Friends, family members or other witnesses may report such social incidents via the telephone, e-mails or in-person, which requires the reporting person to identify himself or herself. In addition to being identified, such persons often face interference with personal time and space, which may deter them from actually making the reports. The provision of anonymity is typically not available since the veracity of any report by an anonymous person cannot be resolved with certainty.

A lack of a framework that allows a person to anonymously report social incidents or individuals who need assistance can prevent or delay delivery of much needed help. Aid agencies or organizations are not able to optimize the deployment of resources, e.g., opening a mental health care center at a location where many people are affected within the vicinity. Absence of such framework also presents a gap in investigative assistance tools available to such agencies.

SUMMARY

A framework for facilitating anonymous reporting of social incidents is described herein. In accordance with one aspect of the framework, at least one input report of a social incident is received from at least one user device. The input report may be submitted by a user associated with verified credentials. An equivalence class may be identified for the input report. If a count associated with the equivalence class exceeds a predetermined threshold value, anonymized information based on the input report may be distributed to initiate action responsive to the social incident.

In accordance with another aspect, reports of at least one social incident are received from user devices. One or more equivalence classes of the reports are determined. An equivalence class with a count exceeding a predetermined threshold value may be selected from the one or more equivalence classes. Anonymized information based on the reports of the selected equivalence class may then be distributed to at least one client device so as to initiate action responsive to the social incident.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for facilitating reporting of social incidents is described herein. "Social incidents", as used herein, generally refer to occurrences, individuals or situations in a community that require external assistance. Examples of social incidents include, but are not limited to, an abuse occurrence (e.g., child, elder, spousal, animal abuse, etc.), a mental disability occurrence, or other suspicious activities (e.g., kidnapping) in the community.

One aspect of the present framework enables persons to anonymously report such social incidents. Another aspect of the present framework analyzes and presents reports from multiple sources in visual form. Yet another aspect connects multiple aid agencies or organizations to share the received reports, identifies particular types of reports and disseminates the reports to the appropriate agency, and/or facilitates optimization in deployment of resources to provide assistance.

In accordance with some implementations, after any report of a social incident has been received, the framework proceeds to identify the report with its appropriate equivalence class. If the count value of assigned equivalence class exceeds a predefined threshold value, the framework may send a notification of availability of the report to initiate action responsive to the social incident. These and other features and advantages will be described in more detail herein.

It should be appreciated that the framework described herein may be implemented as a method, a computer-controlled apparatus, a computer process, a computing system, or as an article of manufacture such as a computer-usable medium. These and various other features will be apparent from the following description.

Figure 1:
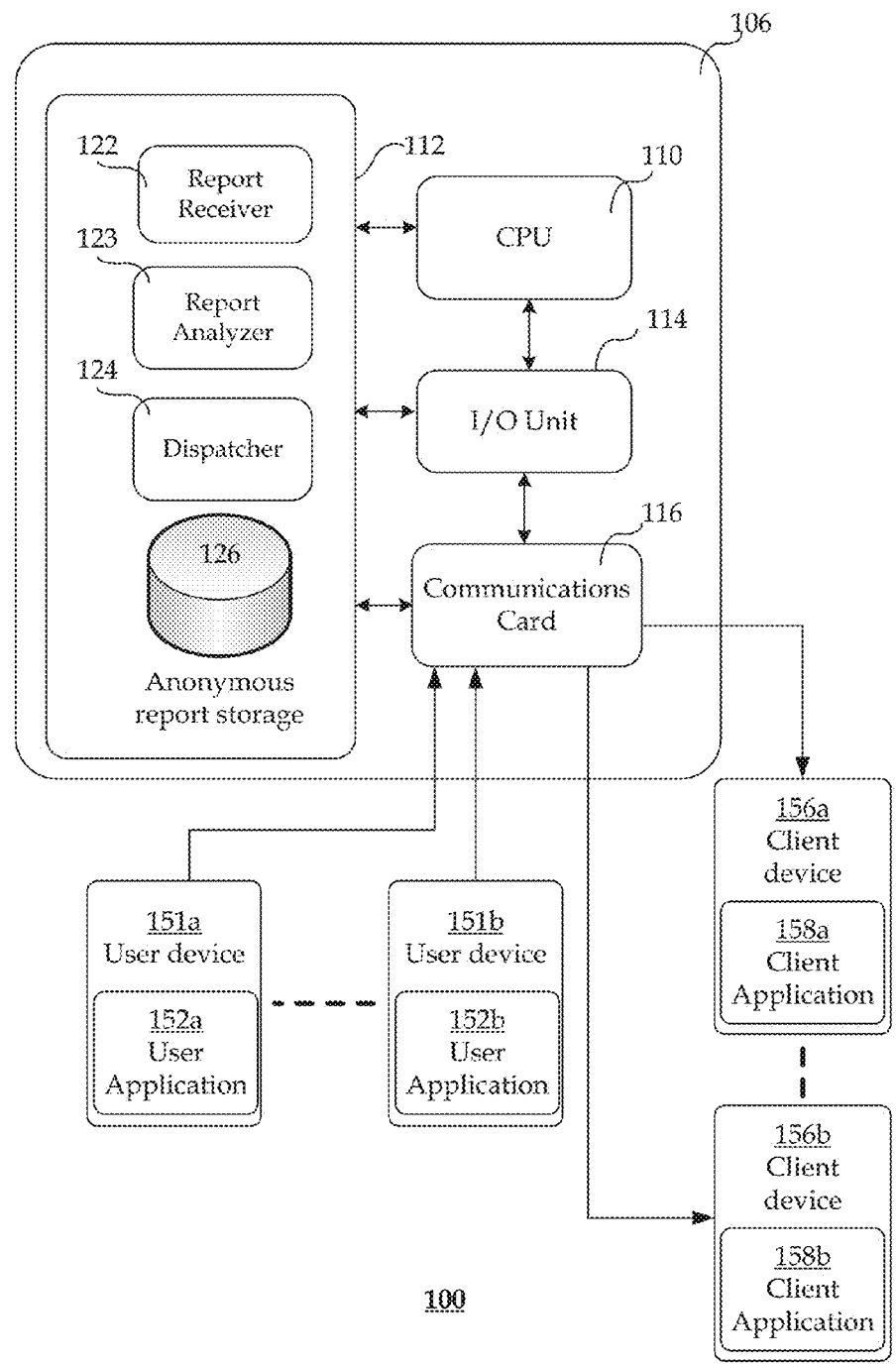
FIG. 1 is a block diagram illustrating an exemplary architecture.

FIG. 1 is a block diagram illustrating an exemplary architecture 100 in accordance with one aspect of the present framework. Generally, exemplary architecture 100 may include a computer system 106, one or more user devices 151 and one or more client devices 156.

Computer system 106 can be any type of computing device capable of responding to and executing instructions in a defined manner, such as a workstation, a server, a portable laptop computer, another portable device, a mini-computer, a mainframe computer, a storage system, a dedicated digital appliance, a device, a component, other equipment, or some combination of these. Computer system 106 may include a central processing unit (CPU) 110, an input/output (I/O) unit 114, a memory module 112 and a communications card or device 116 (e.g., modem and/or network adapter) for exchanging data with a network (e.g., local area network (LAN), wide area network (WAN), Internet, etc.). It should be appreciated that the different components and sub-components of the computer system 106 may be located or executed on different machines or systems. For example, a component may be executed on many computer systems connected via the network at the same time (i.e., cloud computing).

Computer system 106 may serve as a central server and operate in a networked environment using logical connections to one or more user devices 151a-b and one or more client devices 156a-b. Each user device 151a-b may be associated with one or more particular users, and serve as an interface to send and receive information from computer system 106. Users of user devices 151a-b may be, for example, witnesses, relatives or friends of victims of social incidents who desire to submit reports of such social incidents.

In some implementations, the user device 151 is a mobile device that includes, but is not limited to, a smart phone, a tablet computer, a laptop, a cellular device, a mobile phone, a gaming device, a portable digital assistant (PDA), a portable media player, a wireless device, a data browsing device, and so forth. User device 151 may include components similar to a computer system, such as an input device for receiving and processing user input (e.g., touch screen, keypad, freeform text recognition module, speech recognition module, etc.), an output device for displaying a graphical user interface, a communications card, memory for storing a user application 152 and data, a processor for executing the user application, and so forth. User device 151 may be communicatively coupled to a navigation system (e.g., Global Positioning System (GPS) or Global Navigation Satellite System (GLONASS)) that provides a geographical location of the user device.

User applications 152a-b may include, for example, a mobile application or app running on a mobile user device, or a client application executed via a web browser communicatively connected to the computer system 106. User application 152a-b may present a user interface (e.g., graphical user interface) to access one or more reporting-related services, including services provided by computer system 106. The user interface may, for example, enable users to anonymously report social incidents, as will be described in more detail later.

Computer system 106 may dispatch report-related information to client devices 156a-b to initiate action. Client devices 156a-b may be associated with, for example, local agencies, organizations or authorities located in close proximity to the location of social incident and capable of rendering assistance. Local agencies may include, for example, a mental health facility, an aid agency, a protective services agency, and so forth.

Memory module 112 of the computer system 106 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by CPU 110. As such, the computer system 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 of the computer system 106 includes one or more components for implementing the techniques described herein, such as a report receiver 122, a report analyzer 123, a dispatcher 124 and an anonymous report storage 126. Anonymous report storage 126 may include, for example, a database to store anonymized reports. It should be appreciated that some or all of these exemplary components may also be implemented in another computer system (e.g., user or client device).

Figure 2:
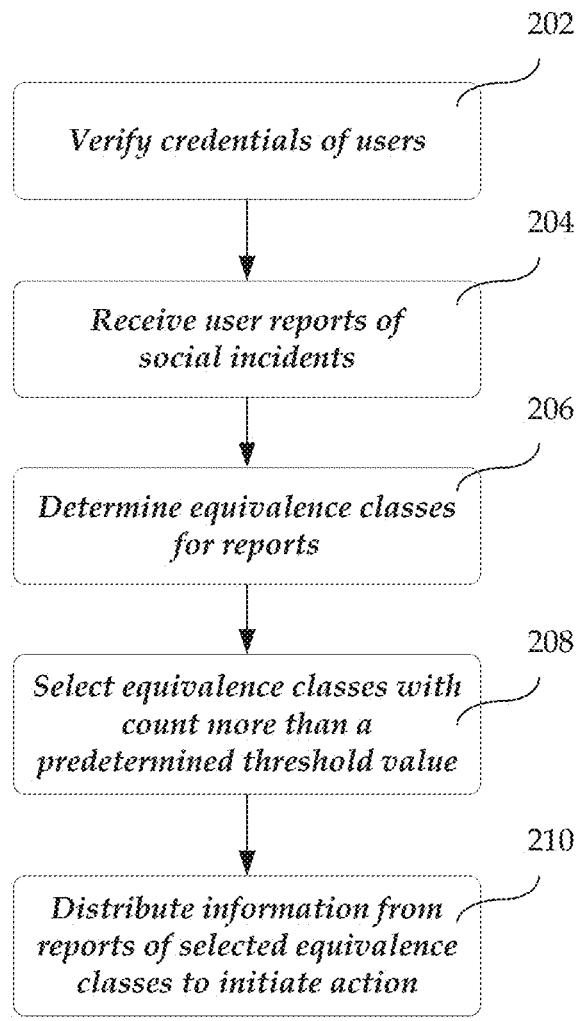
FIG. 2 shows an exemplary method for anonymous reporting of social incidents.

FIG. 2 shows an exemplary method 200 for anonymous reporting of social incidents. The method 200 may be performed automatically or semi-automatically by the system 100, as previously described with reference to FIG. 1. It should be noted that in the following discussion, reference will be made, using like numerals, to the features described in FIG. 1.

At 202, report receiver 122 verifies credentials of one or more users. User credentials may include any identification data that identifies the user, such as name, address, date of birth, social security number or any other unique national identification number, and so forth. Upon successfully verifying the user's credentials, the report receiver 122 registers the user, and allows the user to login and anonymously submit reports to the system 106.

The report receiver 122 may verify a user's credentials by various mechanisms, such as credit card verification, or through a user application 152 on a user device 151 that already has its credibility verified. The report receiver 122 may also accept user credentials provided by trusted third parties with access to the user's identification data (e.g., government authorities such as department of motor vehicles). For example, citizens or residents of a city or a geographical region may be automatically registered as users. The computer server 106 itself may also be independently owned, controlled and/or maintained by a government authority that has access to identification data of citizens or residents of a geographic region (e.g., city, state, county, country, etc.). User credentials may be kept anonymous so that user identification data is not revealed to, for example, client applications 158*a-b* or anyone with access to report-related information provided by computer system 106 unless required by law or any authorized jurisdiction.

At 204, report receiver 122 receives reports of social incidents. A registered user associated with verified credentials may submit a report via a user application 152 implemented on a user device 151. The user application 152 may provide a user interface (e.g., graphical user interface) to allow the user to select input information for various parameters of the report. The reports may be anonymized (i.e. user identification information removed) and stored separately in, for instance, the anonymous report storage 126, for retrieval and analysis. The reports received by the report receiver 122 may be combined with similar reports from other sources for analysis. For example, another system may enable users to report incidents with identification. In such case, the anonymous reports from the anonymous report storage 126 may be used to augment such reports collected from the other sources for analysis.

Figure 3:
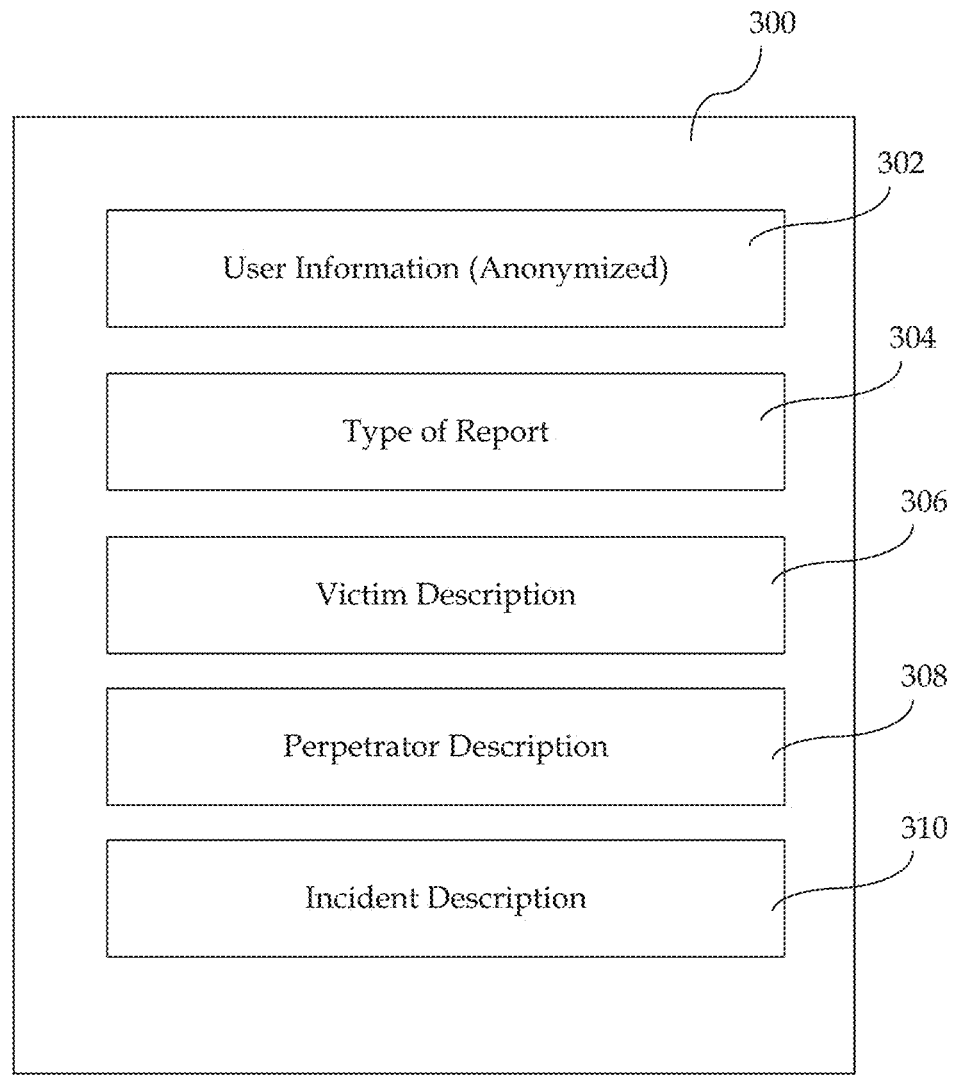
FIG. 3 shows an exemplary report with various report parameters.

FIG. 3 shows an exemplary report 300 with various report parameters 302-310. "User information" parameter 302 stores user identification data (e.g., name, date of birth, address, etc.). Such user identification data may be anonymized (e.g., hidden) during analysis of the reports to maintain the confidentiality of the reporting user. As discussed previously, user identification data is not revealed to, for example, client applications 158*a-b* or other users with access to report-related information provided by computer server 106 unless required by law or any authorized jurisdiction.

"Type of report" parameter 304 stores a general description of the type of social incident reported. A pre-defined set of options may be provided to the user to select the "type of report" via the user application 152. Examples of these options include, but are not limited to, "Child Abuse", "Elderly Abuse", "Abuse on Women", "Person with Mental Instability", "Person with Mental Depression", "Suspicious Activity", etc. The user may also customize the type of report by entering a string of characters in the relevant field.

"Victim Description" parameter 306 stores attributes about the individual affected by the social incident. "Perpetrator Description" parameter 308 may be an optional parameter that stores attributes about the individual responsible for the social incident. Attributes about the victim or perpetrator may include age (actual or approximate), gender, physical attributes (e.g., eye color, hair color, skin color, attire, etc.), and any other observable or non-observable information that may help to identify the individual. Certain attributes (e.g., age) may not be exactly measurable or known to the reporting user. The reporting user may therefore qualify the attribute as "approximate".

"Incident Description" parameter 310 may store various types of information regarding the incident. In some implementations, a timestamp indicating the time when the incident happened and another timestamp indicating when the report was submitted are automatically included in such parameter 310. The user may also input the actual or approximate time of occurrence. In some implementations, the geographical location of the incident is stored in the parameter 310. The geographical location may be provided by a navigation system (e.g., GPS) that is communicatively coupled to the user device 151. The user may also provide the geographical location by, for example, inputting an address or exporting the location from a map provided by the user application 152 or any third party application. Optionally, the user may attach digital media files (e.g., photos, video or voice recordings) to the report, which may be stored or linked by the parameter 310.

Returning back to FIG. 2, at 206, report analyzer 123 determines equivalence classes of received reports. Reports that are determined to be identical, meaning that they report the same incident (i.e. include similar parameter values), are combined to form an equivalence class. In some implementations, no single report can belong to two different equivalence classes. This means that any report belongs to one and only one equivalence class.

Any two reports belonging to an equivalence class have substantially identical information in the report parameters. Range queries may be used to search for reports with parameter values similar to an input report's parameter values. For example, a report indicating a victim's age as 6 years old with a qualifier "approximate" may be used as an input report to search for similar reports that may be grouped together with the input report in an equivalence class. The query may return, for example, a similar report indicating a victim's approximate age as 7 years old. The query may be performed by applying a classifier. Machine learning techniques may be performed to train classifiers to identify equivalence classes of reports.

In some implementations, a different report is determined to belong to an equivalence class of the input report only if multiple corresponding parameter values substantially match. In other words, an equivalence class may be determined by searching for a similar report with multiple substantially matching parameter values. A first report contained within a second report may also be considered to belong to an equivalence class of the second report. In such case, all the parameter values of the first report are present in the second report and the second report contains certain additional parameter values that are not present in the first report. If a set of parameter values in a report are mutually exclusive with a set of parameter values from another report, the two reports may still belong to the same equivalence class provided the rest of the parameter values substantially match in the query.

A predefined geographic boundary mechanism may be used as a threshold for matching geographical location parameter values of the reports to determine equivalence classes. One example of such threshold includes an extended boundary around a residential area within which residents are known to visit frequently. Reports containing geographical location parameter values falling within a predefined boundary may be considered to be associated with the same incident if other parameters of the reports are substantially similar and therefore allow them to belong to an equivalence class.

Additionally, while performing analysis on reports, particularly while determining equivalence classes, reports may be selected from a pre-defined timestamp window within which parameters are not deemed to change significantly. For example, a report received more than a year ago may not provide correct information about age parameters included in it. Accordingly, the timestamp window may be pre-defined as one year so as to include only reports that are received less than one year ago in the equivalence classes.

In some implementations, report analyzer 123 performs causal analysis based on data from multiple data sources. Data derived from reports in anonymous report storage 126 may be analyzed in conjunction with data obtained from other data sources (e.g., hospitals) to determine why the reported incident occurred. For example, reports of "mental disorder" type may be visualized across multiple geographic areas and compared against multiple "causal parameters".

"Causal parameters" generally refer to factors that are identified as candidate causes of the particular incident. Examples of causal parameters include, but are not limited to, infrastructure entities (e.g., heavy industrial buildings, chemical plants, local population density, etc.), historical weather elements, and so forth. Causal parameters may be compared against particular types of reports along a timeline. Causal analysis may reveal, for example, that after a certain pattern in the causal parameters was introduced, the number of reports of a specific type had increased in a certain locality or region.

At 208, report analyzer 123 selects equivalence classes with a count more than a predetermined threshold value. "Count" for any equivalence class is a parameter that denotes the number of times the incident has been reported (i.e. number of reports within the class). "Count" may also represent the number of users who have reported the same incident. An equivalence class can have a count of one, in which case there is only one report included in that class. Equivalence classes with a count more than a predetermined threshold value may be considered to be of higher authenticity or credibility. Reports represented by equivalence classes with counts higher than the predefined threshold value are thus considered to be of higher credibility, and are therefore selected and used to initiate action responsive to the incident.

At 210, dispatcher 124 distributes information from reports of selected equivalence classes to initiate action. As discussed previously, such information is anonymized to protect the privacy of the reporting users. In some implementations, the agency or organization that owns, controls and/or maintains the system 106 initiates action upon receiving notification from the dispatcher 124 that the reports are available. Additionally, or alternatively, dispatcher 124 may distribute information derived from the analysis of the reports to other client devices 156a-b for initiating action by other agencies.

Multiple other agencies may register with the system 106, via respective client applications 158a-b to receive information regarding a certain "type of report" in a particular geographic area for which they are responsible. The agencies may also register with their internet protocol (IP) addresses, which allow the dispatcher 124 to determine the location of the agencies. Accordingly, different local agencies may cooperate to respond to different types of incidents in a particular geographic location. Dispatcher 124 may identify one or more agencies responsible for a particular social incident type, and distribute the anonymized information to the identified one or more agencies.

For example, a particular agency or government body responsible for taking action in response to "Child Abuse" type of reports for a certain district may register with the system 106 to receive information associated with reports of that type. Examples of actions that may be taken in response to a report include initiating mass communication targeted at a certain location to alert the public, opening a helpline booth in a certain location, or sending authorized personnel (e.g., social workers, counselors, police, etc.) to handle the incident particularly if the report has attained enough credibility.

While the present framework is described as supporting multiple agency participation, it should be appreciated that the system 106 may also perform in isolation where the agency storing the reports and receiving the report analysis are the same.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. An anonymous reporting system comprising:
a non-transitory memory device for storing computer-readable program code; and
a processor in communication with the memory device, the processor being operative with the computer-readable program code to
verify user credentials of reporting users wishing to submit social incident reports, wherein each social incident report includes personal information of the reporting users based on the user credentials and incident information of a social incident,
register, in response to successful verification of the user credentials, the verified reporting users, wherein the registration enables the verified reporting users to login to the anonymous reporting system to submit incident reports,
receive, from reporting user devices of the verified reporting users, incident reports of at least one social incident,
determine one or more equivalence classes of the incident reports by applying a classifier trained by a machine learning technique that identifies similar incident reports associated with multiple substantially matching parameter values, wherein one or more of said parameter values are associated with at least one victim of the at least one social incident,
select, from the one or more equivalence classes, an equivalence class with a count exceeding a predetermined threshold value,
transform the incident reports into anonymized incident reports, wherein the anonymized incident reports contain no personal information of the verified reporting users, and
distribute, to at least one client device, the anonymized incident reports of the selected equivalence class to initiate action responsive to the social incident by a client user of the client device.

2. The system of claim 1 wherein at least one of the one or more equivalence classes comprises incident reports received within a pre-defined timestamp window.

3. The system of claim 1 wherein the processor is operative with the computer-readable program code wherein each of the incident reports belongs to only one of the one or more equivalence classes.

4. The system of claim 3 wherein at least one of the substantially matching parameter values comprises a geographical location parameter value.

5. The system of claim 1 wherein the social incident comprises an abuse occurrence, a mental disability occurrence or a suspicious activity in a community.

6. A method of anonymous reporting performed by a computer system, comprising:
verifying user credentials of a reporting user wishing to submit a social incident report from a reporting user device;
registering, in response to successful verification of the user credentials, the verified reporting user, wherein the registration enables the verified reporting user to login to the anonymous reporting system to submit the incident report;

receiving, from the reporting user device, at least one input incident report of a social incident submitted by the verified reporting user, wherein the incident report includes personal information of the verified reporting user based on the user credentials and incident information of a social incident;

transforming the input incident report into an anonymized input incident report, the anonymized incident report contains no personal information of the verified reporting user;

storing the input anonymized incident report in an anonymous report storage containing previously submitted anonymized incident reports;

identifying an equivalence class for the input incident report based on the previously submitted anonymized incident reports stored in an incident report database by applying a classifier trained by a machine learning technique that identifies similar incident reports associated with multiple substantially matching parameter values, wherein one or more of said parameter values are associated with at least one victim of the social incident; and distributing anonymized incident reports to initiate action responsive to the social incident of the anonymized input incident report, wherein the distributing is performed in response to a count associated with the equivalence class exceeding a predetermined threshold value.

7. The method of claim 6 wherein the social incident comprises an abuse occurrence, a mental disability occurrence or a suspicious activity in a community.

8. The method of claim 6 further comprising accepting the verified credentials of the reporting user from a trusted third party system and automatically registering the verified reporting user.

9. The method of claim 6 wherein the input incident report comprises a type of report parameter, a victim description parameter, a perpetrator description parameter, an incident description parameter, or a combination thereof.

10. The method of claim 6 wherein identifying the equivalence class for the input incident report comprises performing a range query to search for incident reports that are substantially similar to the input incident report.

11. The method of claim 6 wherein each of the incident reports belongs to only one of the one or more equivalence classes.

12. The method of claim 11 wherein the matching geographical location parameter value is within a predefined geographic boundary of a residential area.

13. The method of claim 6 further comprising performing causal analysis to determine why the social incident occurred.

14. The method of claim 13 wherein performing the causal analysis comprises comparing the input incident report against multiple causal parameters along a timeline.

15. The method of claim 6 wherein the count represents a number of reports with the equivalence class.

16. The method of claim 6 wherein the count represents a number of reporting users who have submitted incident reports within the equivalence class.

17. The method of claim 6 wherein distributing the anonymized incident reports comprises identifying one or more agencies responsible for the social incident type, and distributing the anonymized incident reports to the identified one or more agencies.

18. A non-transitory computer-readable medium having stored thereon program code, the program code executable by a computer to perform anonymous reporting comprising:

verifying user credentials of a reporting user wishing to submit a social incident report from a reporting user device;

registering, in response to successful verification of the user credentials, the verified reporting user, wherein the registration enables the verified reporting user to login to the anonymous reporting system to submit the incident report;

receiving, from the reporting user device, at least one input incident report of a social incident submitted by the verified reporting user, wherein the incident report includes personal information of the verified reporting user based on the user credentials and incident information of a social incident;

transforming the input incident report into an anonymized input incident report, the anonymized incident report contains no personal information of the verified reporting user;

storing the input anonymized incident report in an anonymous report storage containing previously submitted anonymized incident reports;

identifying an equivalence class for the input incident report based on the previously submitted anonymized incident reports stored in an incident report database by applying a classifier trained by a machine learning technique that identifies similar incident reports associated with multiple substantially matching parameter values, wherein one or more of said parameter values are associated with at least one victim of the social incident; and distributing anonymized incident reports to initiate action responsive to the social incident of the anonymized input incident report, wherein the distributing is performed in response to a count associated with the equivalence class exceeding a predetermined threshold value.

19. The non-transitory computer-readable medium of claim 18 further comprising performing causal analysis to determine why the social incident occurred, wherein the causal analysis comprises comparing the input incident report against multiple causal parameters along a timeline.

* * * * *